US012571474B2

(12) United States Patent
Yu et al.

(10) Patent No.: US 12,571,474 B2
(45) Date of Patent: Mar. 10, 2026

(54) FLOATING BALL STRUCTURE AND HUMIDIFIER

(71) Applicant: Shenzhen Hesung Innovation Technology Co., LTD, Shenzhen (CN)

(72) Inventors: Xinfeng Yu, Shenzhen (CN); Xianglu Dai, Shenzhen (CN); Aimin He, Shenzhen (CN); Lihu Wei, Shenzhen (CN)

(73) Assignee: Shenzhen Hesung Innovation Technology Co., LTD, Shenzhen (CN)

( * ) Notice: Subject to any disclaimer, the term of this patent is extended or adjusted under 35 U.S.C. 154(b) by 157 days.

(21) Appl. No.: 18/637,345

(22) Filed: Apr. 16, 2024

(65) Prior Publication Data

US 2025/0215997 A1 Jul. 3, 2025

(30) Foreign Application Priority Data

Jan. 3, 2024 (CN) .......................... 202420011697.1

(51) Int. Cl.
*F16K 31/22* (2006.01)
*F16K 1/20* (2006.01)
(Continued)

(52) U.S. Cl.
CPC ............ *F16K 1/2007* (2013.01); *F16K 31/22* (2013.01); *F16K 31/26* (2013.01); *F24F 6/00* (2013.01)

(58) Field of Classification Search
CPC ........ F16K 31/22; F16K 31/26; F16K 1/2007; F24F 6/00; F24F 2006/008
See application file for complete search history.

(56) References Cited

U.S. PATENT DOCUMENTS 5,673,895 A * 10/1997 Kaneko ............... F16K 27/0218
251/305
6,178,985 B1 * 1/2001 Robinson .................. F16T 1/24
137/195
(Continued)

FOREIGN PATENT DOCUMENTS

CN 108343752 A * 7/2018 ........... F16K 1/2007
CN 109237757 A * 1/2019 ............. F24F 13/00
(Continued)

OTHER PUBLICATIONS

Translation of KR 20110122418 (Year: 2011).*
(Continued)

*Primary Examiner* — Umashankar Venkatesan
(74) *Attorney, Agent, or Firm* — ArentFox Schiff LLP

(57) ABSTRACT

Provided are a floating ball structure and a humidifier. The floating ball body is connected to the floating ball stem, a part of the first insert is disposed in the receiving cavity, another part of the first insert extends through the first through-hole, a part of the second insert is disposed in the receiving cavity, another part of the second insert extends through the second through-hole and protrudes from the floating ball stem, at least one of the first insert or the second insert is able to slide relative to the floating ball stem in a first direction, at least one of the first insert or the second insert has a drive block, the drive block extends through the third through-hole and protrudes from the floating ball stem, and the drive block is able to drive the first insert or the second insert to move in the first direction.

20 Claims, 5 Drawing Sheets

(51) Int. Cl.
    *F16K 31/26*      (2006.01)
    *F24F 6/00*       (2006.01)

(56)           References Cited

U.S. PATENT DOCUMENTS

| | | | | |
|---|---|---|---|---|
| 9,624,837 | B2 * | 4/2017 | Abram | F01N 1/16 |
| 10,088,070 | B2 * | 10/2018 | Feng | F16K 31/088 |
| 10,718,443 | B2 * | 7/2020 | Hung | A01G 17/005 |
| 10,731,772 | B2 * | 8/2020 | Czyszczon | F16K 31/30 |
| 11,199,359 | B2 * | 12/2021 | Steichen | F27B 1/20 |
| 2013/0019962 | A1 * | 1/2013 | Peters | F16K 31/24 |
| | | | | 137/409 |

FOREIGN PATENT DOCUMENTS

| | | | | | |
|---|---|---|---|---|---|
| KR | 20110122418 | A | * | 11/2011 | B01D 46/0001 |
| KR | 20200030011 | A | * | 3/2020 | F24F 11/0008 |

OTHER PUBLICATIONS

Translation of CN 108343752 (Year: 2017).*
Translation of CN 109237757 (Year: 2019).*
Translation of KR 20200030011 (Year: 2019).*

* cited by examiner

First direction

FLOATING BALL STRUCTURE AND HUMIDIFIER

CROSS-REFERENCE TO RELATED APPLICATION(S)

This application claims priority to Chinese Patent Application No. 202420011697.1 filed Jan. 3, 2024, the disclosure of which is incorporated herein by reference in its entirety.

TECHNICAL FIELD

The present application relates to the field of humidifier technologies, particularly a floating ball structure and a humidifier.

BACKGROUND

With the increasing improvement of people's living standards, a higher requirement for indoor air quality and humidity is put forward. In each dry and cold season, air contains less vapor. To ensure a healthy humid environment in a room, water or vapor requires to be added to air in an artificial manner, thereby generating various humidifier products. An ultrasonic humidifier atomizes water into 1- to 5-micron ultra-fine particles according to the principle of ultrasonic high-frequency oscillation and diffuses mist into air by using a wind apparatus, thereby humidifying air uniformly.

The related art discloses a humidifier-specific micro floating ball valve. The floating ball valve includes a floating ball, a valve stem, a valve body, an adhesive plug, and a slider. The upper part of the valve body is a water inlet. The lower part of the valve body is a drive cartridge. The inside of the water inlet is connected to the drive cartridge by a control hole. A water inlet hole is opened in the inlet wall of the root of the water inlet. The water inlet hole is higher than the control hole. The adhesive plug for plugging the control hole is mounted on the slider. The slider is located in the drive cartridge. The slider has a slip fit with the drive cartridge. The slider is driven by the valve stem. The valve stem is connected to the drive cartridge by a pivot pin. The floating ball is mounted on the valve stem. The cavity of the humidifier body is immersed in water for a long time and thus is prone to generate water scale, affecting the humidification effect. Therefore, it is required to clean components including the floating ball, positioning insert, and atomization plate in the inside of the humidifier body.

However, in this solution, the valve stem connected to the floating ball cooperates with the drive cartridge by using a pivot pin, so damage tends to occur during installation and disassembly, affecting the normal use.

SUMMARY

The present application is aimed to provide a floating ball structure and a humidifier to solve the problem of causing damage during installation and disassembly of the floating ball of an existing humidifier, thus not affecting the normal use.

The present application adopts the solutions below.

In one aspect, the present application provides a floating ball structure. The floating ball structure is configured to open or close the valve of a humidifier. The floating ball structure includes a floating ball body, a floating ball stem, a first insert, and a second insert. The floating ball body is connected to the floating ball stem. The floating ball stem has a receiving cavity. The floating ball stem also has a first through-hole, a second through-hole, and a third through-hole. Each of the first through-hole, the second through-hole, and the third through-hole connects the receiving cavity to the outside of the receiving cavity. A part of the first insert is disposed in the receiving cavity and has an outside diameter greater than the outside diameter of the first through-hole. Another part of the first insert extends through the first through-hole and protrudes from the floating ball stem. A part of the second insert is disposed in the receiving cavity and has an outside diameter greater than the outside diameter of the second through-hole. Another part of the second insert extends through the second through-hole and protrudes from the floating ball stem. At least one of the first insert or the second insert is able to slide relative to the floating ball stem in a first direction. At least one of the first insert or the second insert has a drive block. The drive block extends through the third through-hole and protrudes from the floating ball stem. The drive block is able to drive the first insert or the second insert to move in the first direction.

In a preferred solution of the floating ball structure, one of the first insert or the second insert is fixedly connected to the floating ball stem, and another of the first insert or the second insert is slidably disposed at the floating ball stem.

In a preferred solution of the floating ball structure, the floating ball structure also includes a first elastic member. The first elastic member is configured to constantly have a trend of driving the first insert and the second insert to move away from each other.

In a preferred solution of the floating ball structure, the first insert includes a first cylinder in the receiving cavity and a first bar extending through the first through-hole, the outside diameter of the first cylinder is greater than the outside diameter of the first through-hole, the second insert includes a second cylinder in the receiving cavity and a second bar extending through the second through-hole, and the outside diameter of the second cylinder is greater than the outside diameter of the second through-hole.

In a preferred solution of the floating ball structure, the first insert is fixedly connected to the floating ball stem, the second insert is able to slide relative to the floating ball stem, the second insert includes a first insert shaft and a second elastic member connected to each other, the second elastic member abuts against the first insert, and the second elastic member is configured to constantly have a trend of driving the first insert shaft to move away from the first insert.

In a preferred solution of the floating ball structure, the first insert is fixedly connected to the floating ball stem, the second insert has a drive block, one of the drive block or the floating ball stem is provided with a protrusion, another of the drive block or the floating ball stem is disposed with grooves, and the protrusion is able to be inserted into the grooves.

In a preferred solution of the floating ball structure, the floating ball structure also includes a cover plate, and the floating ball stem also has a counterbore. The counterbore connects the receiving cavity to the outside of the receiving cavity. The first insert and the second insert are able to be mounted to or removed from the floating ball stem through the counterbore. The cover plate is able to open or close the counterbore.

In a preferred solution of the floating ball structure, the floating ball stem also has a bump. The bump is able to contact with or separate from the valve to open or close the valve.

In a preferred solution of the floating ball structure, the floating ball body and the floating ball stem are integrally formed.

In another aspect, the present application provides a humidifier. The humidifier includes a water tank, a base, a valve, and the floating ball structure of any one of previous solutions. The water tank is connected to the base. The valve is disposed at the bottom of the water tank and protrudes into the base. The floating ball structure is located at the base. The floating ball structure is configured to open or close the valve. The first insert and the second insert are each rotatably connected to the base.

The present application has the beneficial effects below.

The present application provides a floating ball structure and a humidifier. The floating ball structure is configured to open or close the valve of the humidifier. The floating ball structure includes a floating ball body, a floating ball stem, a first insert, and a second insert. The floating ball body is connected to the floating ball stem. The floating ball stem has a receiving cavity. The floating ball stem also has a first through-hole, a second through-hole, and a third through-hole. Each of the first through-hole, the second through-hole, and the third through-hole connects the receiving cavity to the outside of the receiving cavity. A part of the first insert is disposed in the receiving cavity and has an outside diameter greater than the outside diameter of the first through-hole. Another part of the first insert extends through the first through-hole and protrudes from the floating ball stem. A part of the second insert is disposed in the receiving cavity and has an outside diameter greater than the outside diameter of the second through-hole. Another part of the second insert extends through the second through-hole and protrudes from the floating ball stem. At least one of the first insert or the second insert is able to slide relative to the floating ball stem in a first direction. At least one of the first insert or the second insert has a drive block. The drive block extends through the third through-hole and protrudes from the floating ball stem. The drive block is able to drive the first insert or the second insert to move in the first direction. When the floating ball structure requires to be connected to the base, the first insert is rotatably connected to one side of the base, the second insert is pressed or the drive block is pushed such that the second insert retracts into the receiving cavity, and the floating ball structure is rotated relatively such that the second insert is released and connected to another side of the base. In this manner, the first insert and the second insert are mounted to the base. When the floating ball structure requires to be removed from the base, the drive block is pushed such that the first insert and the second insert move towards each other relatively and are separated from the base without leaving the receiving cavity. The operation process is simple and convenient. The floating ball structure can be mounted to and removed from the base quickly without causing abrasion, improving the service life of the floating ball structure and the base and ensuring the normal operation of the humidifier.

REFERENCE LIST

Figure 1:
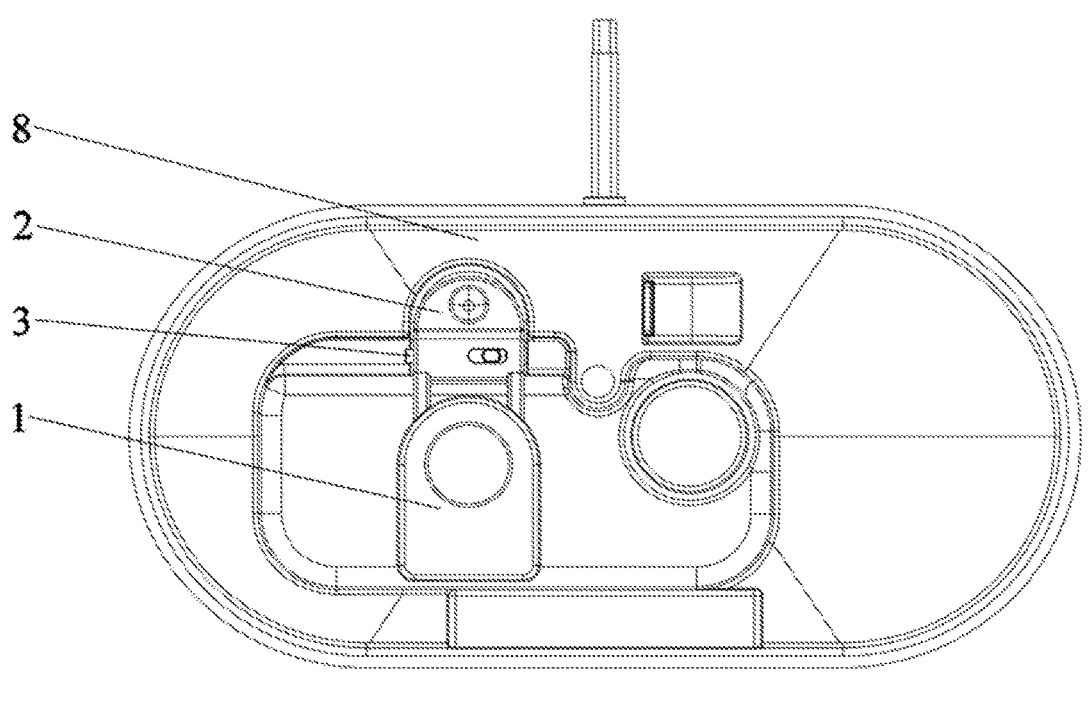
FIG. 1 is a diagram illustrating a structure in which a floating ball structure cooperates with a base according to the present application.

1. floating ball body
2. floating ball stem, 21. first through-hole, 22. second through-hole, 23. third through-hole, 24. counterbore, 25. bump, 26. recess
3. first insert, 31. first cylinder, 32. first bar
4. second insert, 41. second cylinder, 42. second bar, 43. first insert shaft, 44. second elastic member
5. drive block, 51. protrusion
6. first elastic member
7. cover plate
8. base

DETAILED DESCRIPTION

The present application is further described below in detail in conjunction with drawings and embodiments. It is to be understood that the embodiments set forth below are intended to merely illustrate and not to limit the present application. In addition, it is to be noted that, for ease of description, only part, not all, of the structures related to the present application are illustrated in the drawings.

In the description of embodiments of the present utility mode, unless otherwise expressly specified and limited, the term "connected to each other", "connected" or "fixed" is to be construed in a broad sense, for example, as permanently connected, detachably connected, or integrated; mechanically connected or electrically connected; directly connected to each other or indirectly connected to each other through-hole an intermediary; or internally connected or interactional between two components. For those of ordinary skill in the art, specific meanings of the preceding terms in the present application may be understood based on specific situations.

In the present application, unless otherwise expressly specified and limited, when a first feature is described as "on" or "below" a second feature, the first feature and the second feature may be in direct contact, or be in contact through-hole another feature between the two features instead of being in direct contact. Moreover, when the first feature is described as "on", "above", or "over" the second feature, the first feature is right on, above, or over the second feature or the first feature is obliquely on, above, or over the second feature, or the first feature is simply at a higher level than the second feature. When the first feature is described as "under", "below", or "underneath" the second feature, the first feature is right under, below, or underneath the second feature or the first feature is obliquely under, below, or underneath the second feature, or the first feature is simply at a lower level than the second feature.

In the description of this embodiment, it is to be noted that orientations or position relations indicated by terms such as "above", "below", and "right" are based on the drawings. These orientations or position relations are intended only to facilitate the description and simplify an operation and not to indicate or imply that a device or element referred to must have a particular orientation or must be configured or operated in a particular orientation. Thus, these orientations or position relations are not to be construed as limiting the present application. In addition, the terms "first" and "second" are used only to distinguish between descriptions and have no special meaning.

Solutions of the present application are further described below through embodiments in conjunction with the drawings.

Referring to FIG. 1, a humidifier of this embodiment includes a water reservoir, a base, a valve, and a floating ball structure. The water reservoir is connected to the base. The valve is disposed at the bottom of the water reservoir and protrudes into the base. The floating ball structure is located at the base and is configured to open or close the valve. The first insert and the second insert are each rotatably connected to the base. The floating ball structure can rotate relatively as the water level in the base 8 varies. When the water level in the base 8 falls, the floating ball structure also falls. When the floating ball structure rotates to a position at which the valve can be opened, water in the water reservoir passes through the valve and enters the base 8. Water in the base 8 rises gradually and drives the floating ball structure to rotate relative to the valve and rise until the floating ball structure rotates to a position at which the valve is closed. When the floating ball structure rotates to the position at which the valve is closed, water in the water reservoir stops entering the base 8.

It is to be noted that this embodiment is particularly applicable to an ultrasonic humidifier.

Embodiment One

Referring to FIGS. 1 to 5, this embodiment provides a floating ball structure. The floating ball structure is configured to open or close the valve of a humidifier. The floating ball structure includes a floating ball body 1, a floating ball stem 2, a first insert 3, and a second insert 4. The floating ball body 1 is connected to the floating ball stem 2. The floating ball stem 2 has a receiving cavity. The floating ball stem 2 also has a first through-hole 21, a second through-hole 22, and a third through-hole 23. Each of the first through-hole 21, the second through-hole 22, and the third through-hole 23 connects the receiving cavity to the outside of the receiving cavity. A part of the first insert 3 is disposed in the receiving cavity and has an outside diameter greater than the outside diameter of the first through-hole 21. Another part of the first insert 3 extends through the first through-hole 21 and protrudes from the floating ball stem 2. A part of the second insert 4 is disposed in the receiving cavity and has an outside diameter greater than the outside diameter of the second through-hole 22. Another part of the second insert 4 extends through the second through-hole 22 and protrudes from the floating ball stem 2. At least one of the first insert 3 or the second insert 4 is able to slide relative to the floating ball stem 2 in a first direction. At least one of the first insert 3 or the second insert 4 has a drive block 5. The drive block 5 extends through the third through-hole 23 and protrudes from the floating ball stem 2. The drive block 5 is able to drive the first insert 3 or the second insert 4 to move in the first direction. When the floating ball structure requires to be connected to the base 8, the first insert 3 is rotatably connected to one side of the base 8, the second insert 4 is pressed or the drive block 5 is pushed such that the second insert 4 retracts into the receiving cavity, and the floating ball structure is rotated relatively such that the second insert 4 is released and connected to another side of the base 8. In this manner, the first insert 3 and the second insert 4 are mounted to the base 8. When the floating ball structure requires to be removed from the base 8, the drive block 5 is pushed such that the first insert 3 and the second insert 4 move towards each other relatively and are separated from the base 8 without leaving the receiving cavity. The operation process is simple and convenient. The floating ball structure can be mounted to and removed from the base 8 quickly without causing abrasion, improving the service life of the floating ball structure and the base 8 and ensuring the normal operation of the humidifier.

Specifically, the first direction is the direction of the arrow of FIG. 1.

Figure 3:
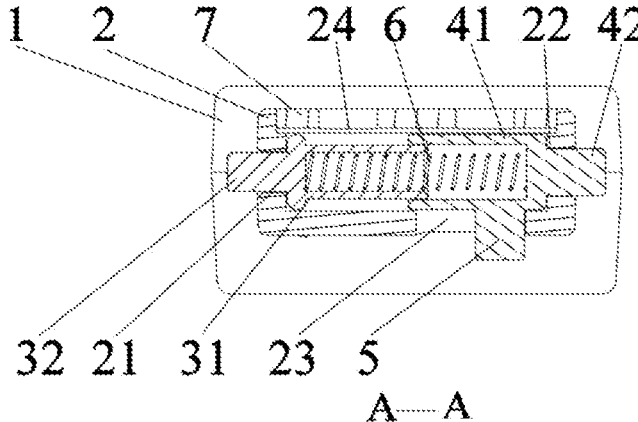
FIG. 3 is a section view taken along A-A of FIG. 2.

Alternatively, referring to FIG. 3, the outside diameter of the second insert 4 is greater than the outside diameter of the first insert 3, the first insert 3 is sleeved in the second insert 4, and the axial direction of the first insert 3 is the same as the axial direction of the second insert 4.

Figure 6:
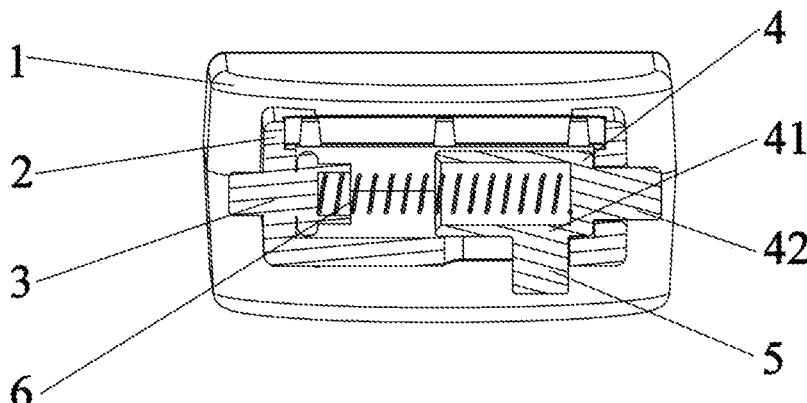
FIG. 6 is a section view of the floating ball structure according to embodiment one of the present application.

Alternatively, referring to FIG. 6, the outside diameter of the second insert 4 is greater than the outside diameter of the first insert 3, the first insert 3 and the second insert 4 are disposed at the floating ball stem 2 and spaced apart in the first direction, and the second insert 4 can sleeve the first insert 3 or keep away from the first insert 3.

Alternatively, the first insert 3 and the second insert 4 are each slidably disposed in the receiving cavity of the floating ball stem 2.

Alternatively, one of the first insert 3 or the second insert 4 is fixedly connected to the floating ball stem 2, and the other of the first insert 3 or the second insert 4 is slidably disposed at the floating ball stem 2. Alternatively, the first insert 3 is fixedly connected to the floating ball stem 2, the second insert 4 is slidably disposed at the floating ball stem 2, the second insert 4 can move towards or away from the first insert 3, and the second insert 4 has a drive block 5. Alternatively, the second insert 4 is fixedly connected to the floating ball stem 2, the first insert 3 is slidably disposed at the floating ball stem 2, the first insert 3 can move towards or away from the second insert 4, and the first insert 3 has a drive block 5.

Preferably, the second insert 4 has a drive block 5. In the axial direction of the second insert 4, the drive block 5 can drive the second insert 4 to move towards the first insert 3.

Alternatively, the first insert 3 has a drive block 5. In the axial direction of the first insert 3, the drive block 5 can drive the first insert 3 to move towards the second insert 4.

Alternatively, each of the first insert 3 and the second insert 4 has a drive block 5.

Referring to FIG. 3, the floating ball structure also includes a first elastic member 6, and the first elastic member 6 is configured to constantly have a trend of driving the first insert 3 and the second insert 4 to move away from each other. When the drive block 5 is pushed such that the first insert 3 and the second insert 4 move towards each other, the first elastic member 6 can apply a force of driving the first insert 3 and the second insert 4 to move away from each other, ensuring that the first insert 3 and the second insert 4 can be restored to their original positions so that the floating ball structure operates normally.

Alternatively, the first elastic member 6 is a compression spring. One end of the compression spring abuts against the first insert 3. The other end of the compression spring abuts against the second insert 4. This arrangement makes a force constantly drive the first insert 3 and the second insert 4 to move away from each other to come into contact with the floating ball stem 2 so that the floating ball structure is rotatably connected of the base 8.

Referring to FIG. 3, the first insert 3 includes a first cylinder 31 in the receiving cavity and a first bar 32 extending through the first through-hole 21, the outside diameter of the first cylinder 31 is greater than the outside diameter of the first through-hole 21, the second insert 4 includes a second cylinder 41 in the receiving cavity and a second bar 42 extending through the second through-hole 22, and the outside diameter of the second cylinder 41 is greater than the outside diameter of the second through-hole 22. This arrangement prevents the first insert 3 and the second insert 4 from leaving the floating ball stem 2 through the first through-hole 21 and the second through-hole 22, thereby ensuring the structural integrity of the floating ball structure.

Alternatively, the inside diameter of the second cylinder 41 is greater than the outside diameter of the first cylinder 31. Thus, the first cylinder 31 can be sleeved in the second cylinder 41.

Alternatively, the drive block 5 is disposed at the second cylinder 41.

Alternatively, the compression spring is disposed in a cavity formed by the first cylinder 31 and the second cylinder 41, and two ends of the compression spring abut against the first cylinder 31 and the second cylinder 41 respectively.

Figure 5:
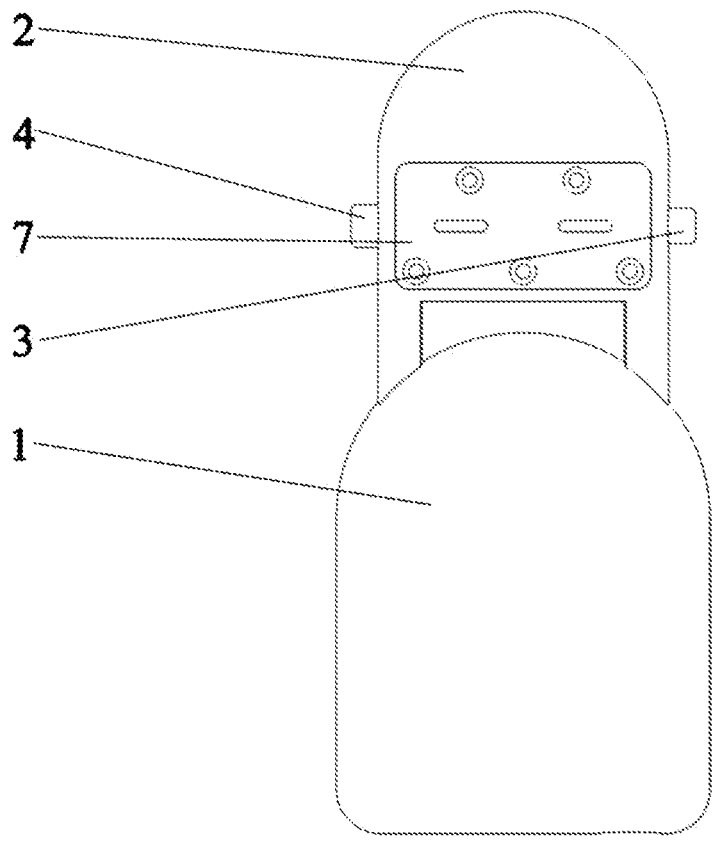
FIG. 5 is a third axonometric view of the floating ball structure according to embodiment one of the present application.

Referring to FIGS. 3 and 5, the floating ball structure also includes a cover plate 7, the floating ball stem 2 also has a counterbore 24, the counterbore 24 connects the receiving cavity to the outside of the receiving cavity, the first insert 3 and the second insert 4 are able to be mounted to or removed from the floating ball stem 2 through the counterbore 24, and the cover plate 7 is able to open or close the counterbore 24. After the first insert 3 and the second insert 4 are damaged, the cover plate 7 is opened, and the first insert 3 and the second insert 4 are taken out and replaced, reducing the maintenance and replacement costs of the floating ball structure. The cover plate 7 for covering the counterbore 24 can prevent external impurities from entering the receiving cavity of the floating ball stem 2, avoid damage to the first insert 3 and the second insert 4 under the action of impurities, and ensure the smoothness of relative movement of the first insert 3 and the second insert 4.

Alternatively, the cover plate 7 is connected to the floating ball stem 2 by a connector. Preferably, the connector is a bolt. The bolt extends through the cover plate 7 and is threadedly connected to the floating ball stem 2.

Figure 2:
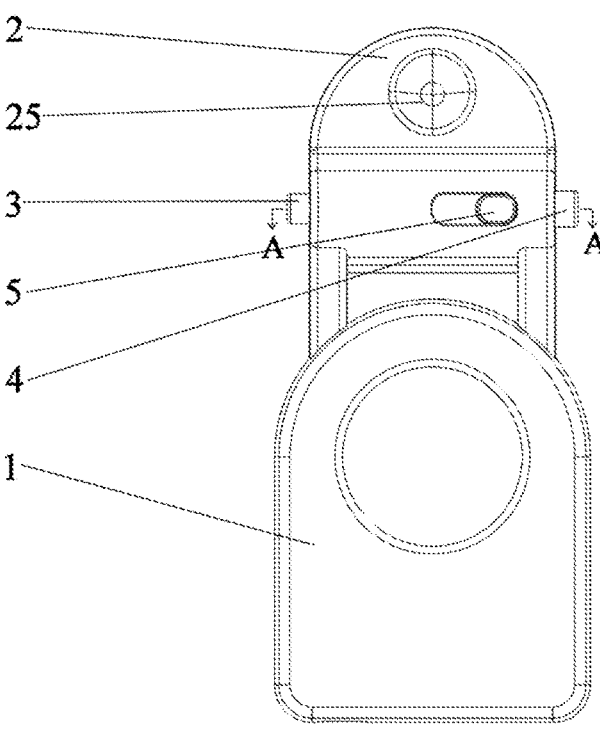
FIG. 2 is a first axonometric view of a floating ball structure according to embodiment one of the present application.
Figure 4:
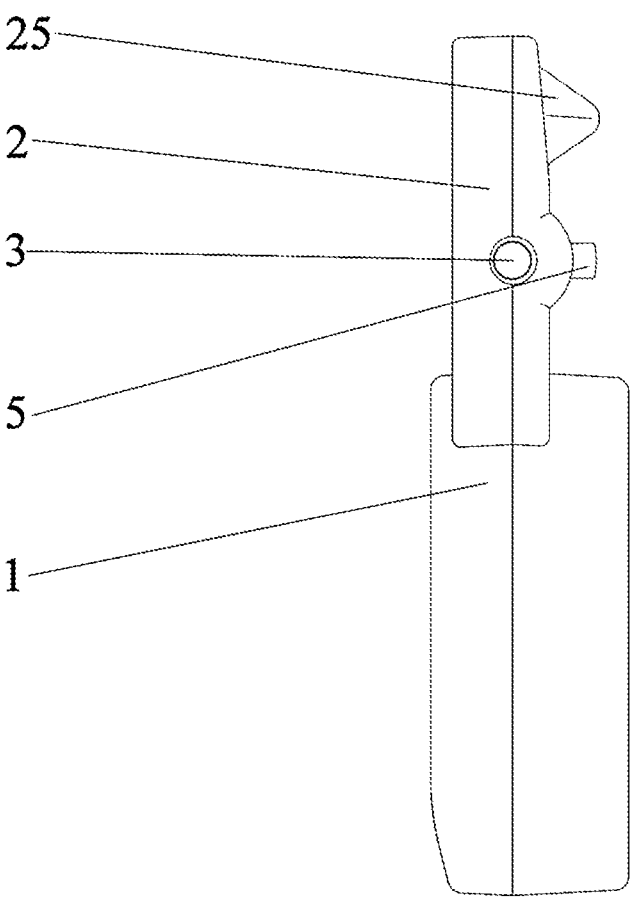
FIG. 4 is a second axonometric view of the floating ball structure according to embodiment one of the present application.

Referring to FIGS. 1, 2, and 4, the floating ball stem 2 also has a bump 25. The bump 25 is able to contact with or separate from the valve to open or close the valve. The floating ball stem 2 rotates relative to the base 8 so that the bump 25 comes into contact with or loses contact with the valve to open or close the valve so that water in the water reservoir enters or stops entering the base 8.

Alternatively, the floating ball body 1 and the floating ball stem 2 are integrally formed. The forming process of the floating ball body 1 and the floating ball stem 2 reduces the number of components. This forming process is high in production efficiency, simple in operation, and low in production costs. The floating ball body 1 and the floating ball stem 2 that are integrally formed have a better quality and a better stability in terms of the integral structure.

Alternatively, the floating ball body 1, the floating ball stem 2, the first insert 3, and the second insert 4 are each made of plastic.

Specifically, the density of the floating ball body 1 and the density of the floating ball stem 2 are less than the density of water so that the floating ball structure can float on the surface of water and can rise and fall as the water level rises and falls.

Alternatively, the floating ball body 1 and the floating ball stem 2 may be produced in a gas-assisted injection molding process or a foam injection molding process.

The operation steps of embodiment one are as follows:

The first elastic member 6 is disposed in the first insert 3 and the second insert 4, and the first insert 3 and the second insert 4 are relatively slidably inserted outside. The first insert 3, the second insert 4, and the first elastic member 6 are placed into the receiving cavity of the floating ball stem 2 through the counterbore 24, the first insert 3 protrudes from the floating ball stem 2 through the first through-hole 21, and the second insert 4 protrudes from the floating ball stem 2 through the second through-hole 22; the cover plate 7 is connected to the floating ball stem 2; and the first insert 3 is rotatably connected to one side of the base 8, the second insert 4 is pressed or the drive block 5 is pushed such that the second insert 4 retracts into the receiving cavity, and the floating ball structure is rotated relatively such that the second insert 4 is released and connected to another side of the base 8.

Embodiment Two

Figure 7:
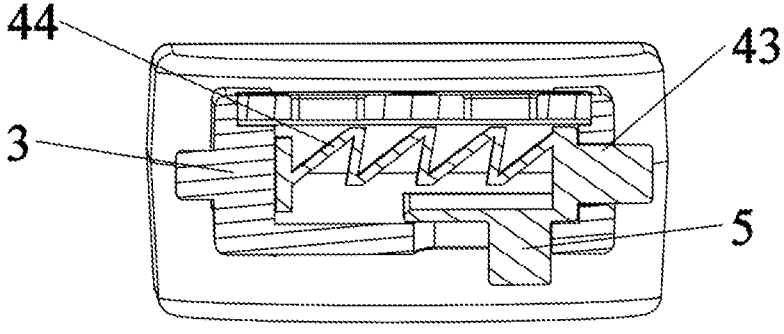
FIG. 7 is a section view of a floating ball structure according to embodiment two of the present application.

Embodiment two includes the floating ball structure of embodiment one. The floating ball structure also includes the following:

Referring to FIG. 7, the first insert 3 is fixedly connected to the floating ball stem 2, the second insert 4 is able to slide relative to the floating ball stem 2, the second insert 4 includes a first insert shaft 43 and a second elastic member 44 connected to each other, the second elastic member 44 abuts against the first insert 3, and the second elastic member 44 is configured to constantly have a trend of driving the first insert shaft 43 to move away from the first insert 3.

When the first insert shaft 43 is pressed or the drive block 5 is pushed, the first insert shaft 43 moves towards the first insert 3. At this time, the second elastic member 44 is compressed by a force and applies a reverse force to the first insert shaft 43. After the first insert shaft 43 is rotatably connected to the base 8, the second insert 4 is restored to its original position under the force applied by the second elastic member 44.

Alternatively, the first insert shaft 43 and the second elastic member 44 are integrally formed.

Embodiment Three

Figure 8:
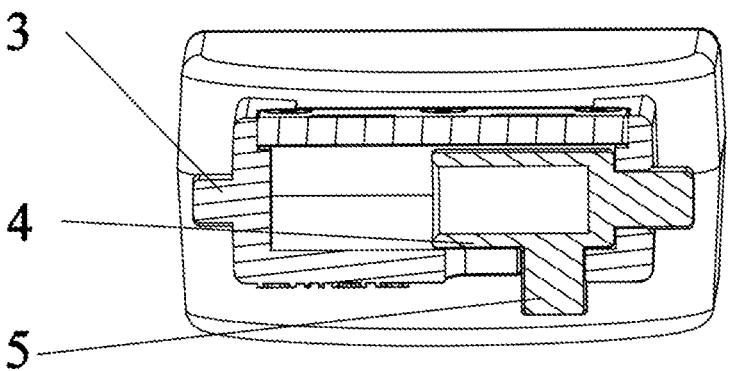
FIG. 8 is a section view of a floating ball structure according to embodiment three of the present application.
Figure 9:
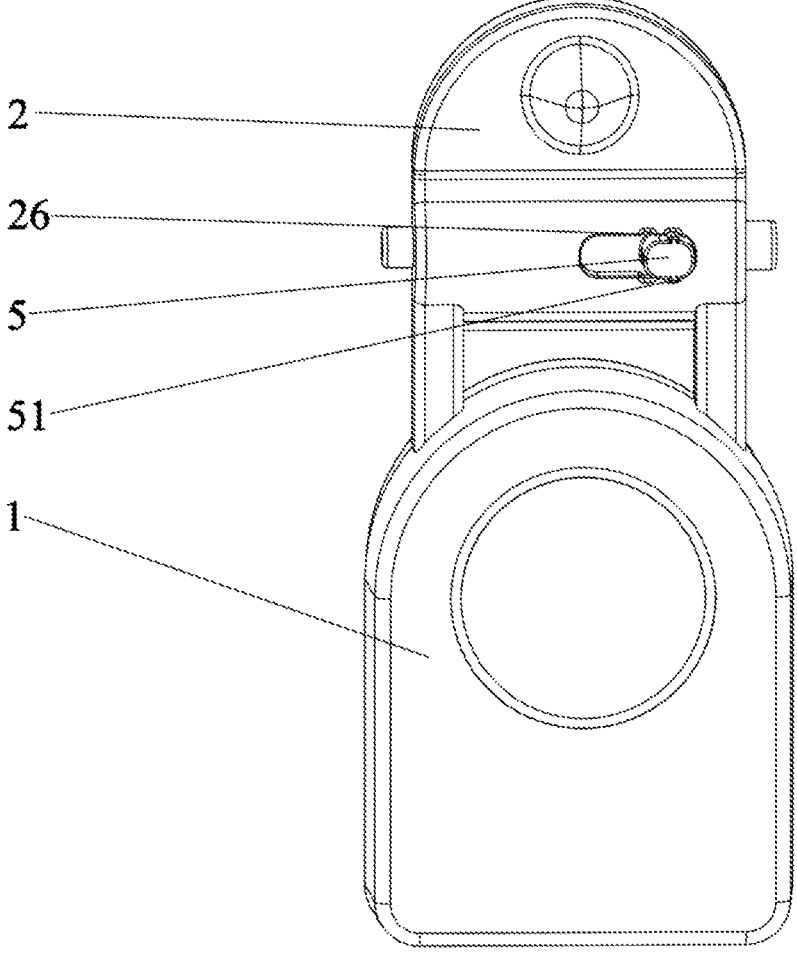
FIG. 9 is a diagram illustrating the structure of the floating ball structure according to embodiment three of the present application.

Embodiment three includes the floating ball structure of embodiment one. The floating ball structure also includes the following:

Referring to FIGS. 8 and 9, the first insert 3 is fixedly connected to the floating ball stem 2, the second insert 4 has a drive block 5, one of the drive block 5 or the floating ball stem 2 is provided with a protrusion 51, the other of the drive block 5 or the floating ball stem 2 is provided with grooves 26, and the protrusion 51 can be inserted into the grooves 26. The protrusion 51 can be inserted into different grooves 26 so that the drive block 5 can move relative to the floating ball stem 2 so that the second insert 4 can be located at different positions of the floating ball stem 2, facilitating connection of the second insert 4 to the base 8.

Alternatively, the drive block 5 is provided with a protrusion 51, and the floating ball stem 2 is provided with two grooves 26 in the first direction. When the second insert 4 is required to be inserted into the base 8, the protrusion 51 is inserted into the recess 26 adjacent to the first insert 3 so that the second insert 4 retracts into the receiving cavity; and after the second insert 4 is rotatably connected to the base 8, the protrusion 51 is inserted into the recess 26 adjacent to the second insert 4 so that the second insert 4 is inserted into the base 8.

Apparently, the preceding embodiments of the present application are merely illustrative examples of the present utility and are not intended to limit implementations of the present application. Those of ordinary skill in the art can make various apparent modifications, adaptations, and substitutions without departing from the scope of the present application. All implementations cannot be and do not need to be exhausted herein. Any modifications, equivalent substitutions and improvements made within the spirit and principle of the present application fall within the scope of the claims of the present application.

What is claimed is:

1. A floating ball structure for opening or closing a valve of a humidifier, comprising:
   a floating ball body, a floating ball stem, a first insert, and a second insert, wherein the floating ball body is connected to the floating ball stem,
   wherein the floating ball stem is provided with a receiving cavity, the floating ball stem is further provided with a first through-hole, a second through-hole, and a third through-hole, and the receiving cavity is in communication with an outside of the floating ball stem through each of the first through-hole, the second through-hole, and the third through-hole,
   wherein a part of the first insert is disposed in the receiving cavity and has an outside diameter greater than an outside diameter of the first through-hole, an other part of the first insert extends through the first through-hole and protrudes from the floating ball stem, a part of the second insert is disposed in the receiving cavity and has an outside diameter greater than an outside diameter of the second through-hole, an other part of the second insert extends through the second through-hole and protrudes from the floating ball stem, and at least one of the first insert or the second insert is configured to slide relative to the floating ball stem in a first direction, and
   wherein at least one of the first insert or the second insert has a drive block, the drive block extends through the third through-hole and protrudes from the floating ball stem, and the drive block is configured to drive the first insert or the second insert to move in the first direction.

2. The floating ball structure of claim 1, wherein one of the first insert or the second insert is fixedly connected to the floating ball stem, and an other of the first insert or the second insert is slidably disposed at the floating ball stem.

3. The floating ball structure of claim 2, further comprising a cover plate, wherein the floating ball stem is further provided with a counterbore, the receiving cavity is in communication with the outside of the floating ball stem through the counterbore, the first insert and the second insert are configured to be mounted to or removed from the floating ball stem through the counterbore, and the cover plate is configured to open or close the counterbore.

4. The floating ball structure of claim 2, wherein the floating ball stem is further provided with a bump, and the bump is configured to contact with or separate from the valve to open or close the valve.

5. The floating ball structure of claim 2, wherein the floating ball stem is further provided with a bump, and the bump is configured to contact with or separate from the valve to open or close the valve.

6. The floating ball structure of claim 1, further comprising a first elastic member, wherein the first elastic member is configured to drive the first insert and the second insert to keep moving away from each other.

7. The floating ball structure of claim 6, wherein the first insert comprises a first cylinder in the receiving cavity and a first bar extending through the first through-hole, an outside diameter of the first cylinder is greater than the outside diameter of the first through-hole, the second insert comprises a second cylinder in the receiving cavity and a second bar extending through the second through-hole, and an outside diameter of the second cylinder is greater than the outside diameter of the second through-hole.

8. The floating ball structure of claim 7, further comprising a cover plate, wherein the floating ball stem is further provided with a counterbore, the receiving cavity is in communication with the outside of the floating ball stem through the counterbore, the first insert and the second insert are configured to be mounted to or removed from the floating ball stem through the counterbore, and the cover plate is configured to open or close the counterbore.

9. The floating ball structure of claim 7, wherein the floating ball stem is further provided with a bump, and the bump is configured to contact with or separate from the valve to open or close the valve.

10. The floating ball structure of claim 6, further comprising a cover plate, wherein the floating ball stem is further provided with a counterbore, the receiving cavity is in communication with the outside of the floating ball stem through the counterbore, the first insert and the second insert are configured to be mounted to or removed from the floating ball stem through the counterbore, and the cover plate is configured to open or close the counterbore.

11. The floating ball structure of claim 6, wherein the floating ball stem is further provided with a bump, and the bump is configured to contact with or separate from the valve to open or close the valve.

12. The floating ball structure of claim 1, wherein the first insert is fixedly connected to the floating ball stem, the second insert is configured to slide relative to the floating ball stem, the second insert comprises a first insert shaft and a second elastic member connected to the first insert shaft, the second elastic member abuts against the first insert, and the second elastic member is configured to drive the first insert shaft to keep moving away from the first insert.

13. The floating ball structure of claim 12, further comprising a cover plate, wherein the floating ball stem is further provided with a counterbore, the receiving cavity is in communication with the outside of the floating ball stem through the counterbore, the first insert and the second insert are configured to be mounted to or removed from the floating ball stem through the counterbore, and the cover plate is configured to open or close the counterbore.

14. The floating ball structure of claim 1, wherein the first insert is fixedly connected to the floating ball stem, the second insert has the drive block, one of the drive block or the floating ball stem is provided with a protrusion, an other of the drive block or the floating ball stem is disposed with grooves, and the protrusion is configured to be inserted into the grooves.

15. The floating ball structure of claim 14, further comprising a cover plate, wherein the floating ball stem is further provided with a counterbore, the receiving cavity is in communication with the outside of the floating ball stem through the counterbore, the first insert and the second insert are configured to be mounted to or removed from the floating ball stem through the counterbore, and the cover plate is configured to open or close the counterbore.

16. The floating ball structure of claim 14, wherein the floating ball stem is further provided with a bump, and the bump is configured to contact with or separate from the valve to open or close the valve.

17. The floating ball structure of claim 1, further comprising a cover plate, wherein the floating ball stem is further provided with a counterbore, the receiving cavity is in communication with the outside of the floating ball stem through the counterbore, the first insert and the second insert are configured to be mounted to or removed from the floating ball stem through the counterbore, and the cover plate is configured to open or close the counterbore.

18. The floating ball structure of claim 1, wherein the floating ball stem is further provided with a bump, and the bump is configured to contact with or separate from the valve to open or close the valve.

19. The floating ball structure of claim 1, wherein the floating ball body and the floating ball stem are integrally formed.

20. A humidifier, comprising:

a water reservoir, a base, a valve, and the floating ball structure of claim 1, wherein the water reservoir is connected to the base, the valve is disposed at a bottom of the water reservoir and protrudes into the base, the floating ball structure is located at the base and is configured to open or close the valve, and the first insert and the second insert are each rotatably connected to the base.

\* \* \* \* \*